Figure 1:
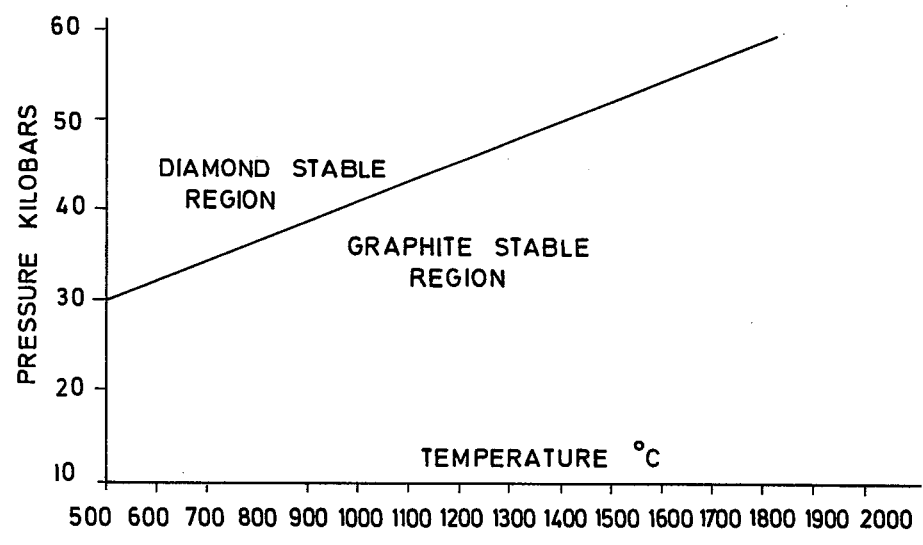

United States Patent [19]

Mitchell

[11] 4,108,614

[45] Aug. 22, 1978

[54] ZIRCONIUM LAYER FOR BONDING DIAMOND COMPACT TO CEMENTED CARBIDE BACKING

[76] Inventor: Robert Dennis Mitchell, 713 Balnagafk, Cnr. Banket & Paul Nel, Hillbrow, Johannesburg, South Africa

[21] Appl. No.: 783,312

[22] Filed: Mar. 31, 1977

[30] Foreign Application Priority Data

Apr. 14, 1976 [ZA] South Africa ..................... 76/2258

[51] Int. Cl.² ............................................. B24D 3/06
[52] U.S. Cl. ................................... 51/295; 51/309 R
[58] Field of Search ........................... 51/309, 295, 293

[56] References Cited

U.S. PATENT DOCUMENTS

| | | | |
|---|---|---|---|
| 2,216,728 | 10/1940 | Benner et al. | 51/298 |
| 3,233,988 | 2/1966 | Wentorf et al. | 51/307 |
| 3,306,720 | 2/1967 | Darrow | 51/309 |
| 3,743,489 | 7/1973 | Wentorf et al. | 51/309 |
| 3,745,623 | 7/1973 | Wentorf et al. | 51/309 |
| 3,779,726 | 12/1973 | Fisk et al. | 51/295 |
| 3,841,852 | 10/1974 | Wilder et al. | 51/295 |
| 3,850,053 | 11/1974 | Bovenkerk | 51/309 |
| 3,852,078 | 12/1974 | Wakatsuki et al. | 51/309 |
| 3,868,234 | 2/1975 | Fontanella | 51/309 |
| 3,871,840 | 3/1975 | Wilder et al. | 51/309 |
| 3,879,901 | 4/1975 | Caveney | 51/295 |
| 3,936,577 | 2/1976 | Christini et al. | 51/309 |

*Primary Examiner*—Donald J. Arnold
*Attorney, Agent, or Firm*—Young & Thompson

[57] ABSTRACT

An abrasive body comprising a diamond compact bonded to a cemented carbide backing by means of a continuous zirconium layer, the thickness of which is less than 0.5 mm, the diamond compact being substantially free of graphite and having a bonding matrix selected from a metal of Group VIII of the Periodic Table or an alloy containing one or more such metals and at least 70 percent by volume of diamond particles, and the cemented carbide backing being selected from cemented tantalum carbide, cemented tungsten carbide and cemented titanium carbide and mixtures thereof.

5 Claims, 2 Drawing Figures

ZIRCONIUM LAYER FOR BONDING DIAMOND COMPACT TO CEMENTED CARBIDE BACKING

This invention relates to abrasive bodies.

Our co-pending application Ser. No. 611,811, now U.S. Pat. No. 4,063,909 describes and claims an abrasive body comprising a compact of cubic boron nitride or diamond abrasive particles or a mixture thereof, present in an amount of at least 50 percent by volume, bonded into a hard conglomerate, at least one surface of the compact having bonded thereto a layer of metal which is a high temperature braze metal capable of wetting the abrasive compact. The compact is substantially free of deteriorated abrasive particles, i.e. substantially free of graphite in the case of diamond compacts and substantially free of hexagonal boron nitride in the case of cubic boron nitride compacts.

The high temperature braze metal is preferably a transition metal such as titanium, chromium, manganese, vanadium, molybdenum, platinum, iron, cobalt, or nickel or an alloy containing one or more of these metals. The preferred metals are stated to be titanium, a copper/titanium alloy or a copper/tin/titanium alloy.

The layer of high temperature braze metal is utilised to bond the compact to a suitable support which may be a cemented tungsten carbide support. Such bodies may be used as tool inserts for the grinding of hard materials.

It has now been found that excellent bonding between the diamond compact and a cemented metal carbide backing can be achieved if the high temperature braze metal is zirconium. Not only is a very strong bond achieved between compact and backing, but also the reproducibility of this strong bond is readily achieved.

Thus, the invention provides an abrasive body comprising a diamond compact bonded to a cemented carbide backing by means of a continuous zirconium layer, the thickness of which is less than 0.5 mm, the diamond compact being substantially free of graphite and having a bonding matrix selected from a metal of Group VIII of the Periodic Table or an alloy containing one or more such metals and at least 70 percent by volume of diamond particles, and the cemented carbide backing being selected from cemented tantalum carbide, cemented tungsten carbide and cemented titanium carbide and mixtures thereof.

The zirconium layer, as mentioned above, is a thin continuous layer, the thickness of which will in general be at least 10 microns. The thickness of the layer is preferably in the range 50 to 500 microns. There will be some alloying between the metal bonding matrix of the compact and the zirconium layer. Similarly, there will be some alloying of the bonding matrix of the cemented carbide backing and the zirconium. In referring to the thickness of the zirconium layer, any alloy portions are included in this thickness.

Preferably the diamond content of the compact will be in the range 80 to 90 percent by volume.

The compact has a metal bonding matrix which is a solvent for diamond growth. Particularly suitable metals are cobalt, iron or nickel or alloys containing one or more of these metals. With such a bonding matrix there will be a certain amount of diamond intergrowth or direct diamond to diamond bonding as compact manufacture, as is known in the art, is carried out under conditions of temperature and pressure in the diamond stable region of the carbon phase diagram. The diamond stable region of the carbon phase diagram is shown in FIG. 1 of the attached drawing. The diamond intergrowth increases the strength and toughness of the compact.

The cemented carbide for the support may be cemented tunsten carbide, cemented titanium carbide, cemented tantalum carbide or mixtures thereof. These cemented carbides are known in the art and are sometimes referred to as "sintered carbide" or "metal bonded carbide". The metal bonding medium for such carbides may be a metal of Group VIII of the Periodic Table such as cobalt, nickel or iron or an alloy containing such a metal. The metal will be present in an amount of 6 to 25 percent by weight.

The backing will generally be very much larger in volume and thickness than the compact.

Figure 2:
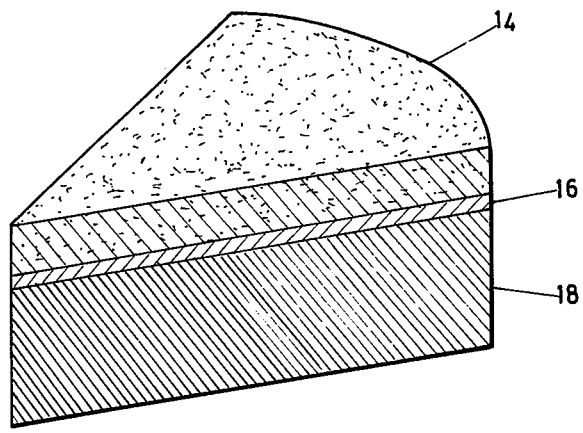

The abrasive bodies of the invention may take a variety of shapes. However, in general the bodies will be in the form of a disc or a segment of a disc. An example of the abrasive body of the invention is illustrated by FIG. 2 of the accompanying drawing. In this figure, the compact is shown at 14, the continuous zirconium layer is shown at 16 and the cemented carbide backing is shown at 18.

The abrasive body of the invention is made in the following manner. A mass of starting material suitable for making the abrasive body of the invention is placed in the reaction capsule of a conventional high temperature/high pressure apparatus suiable for diamond growth such as that described in U.S. patent specification No. 2,941,248. The mass comprises a zirconium foil or layer of zirconium powder on top of a mass of carbide molding powder or preformed cemented carbide body. On top of the zirconium are placed the ingredients necessary for compact manufacture, i.e. diamond plus metal for the bonding matrix. The metal for the bonding matrix can either be in powdered form and admixed with the diamond particles or can be in the form of a layer of metal powder or metal foil on the zirconium. In the latter case a mass of diamond particles is placed on the layer of bonding metal. The contents of the reaction capsule are then subjected to elevated temperature and pressure conditions in the diamond stable region of the carbon phase diagram. The preferred elevated temperature conditions are 1400° C to 1600° C and the preferred elevated pressure conditions are 50 to 75 kilobars. These elevated conditions of temperature and pressure are maintained for at least 3 minutes and generally about 10 to 30 minutes. The temperature of the contents of the reaction capsule is then allowed to return to ambient and the pressure released. The body which is formed in the capsule can be recovered from the capsule using conventional recovery techniques.

An example of the invention will now be described. The following were placed in the reaction capsule of a conventional high temperature/pressure apparatus of the type described in U.S. Pat. No. 2,941,248: a cemented tungsten carbide backing (94 weight percent tungsten carbide/6 weight percent cobalt) in contact with a thin layer (thickness 100 micron) of zirconium metal and a mixture of powdered cobalt and diamond particles on the zironium layer. The powdered cobalt constituted 20 percent by volume of the mixture and the diamond 80 percent by volume. The capsule was placed in the reaction zone of a conventional high temperature/pressure apparatus and the pressure raised to about 70 kilobars and the temperature raised to about 1450°C. The temperature and pressure conditions were maintained for a time sufficient to allow a compact to form from the diamond/cobalt mixture. The temperature was allowed to return to ambient and the pressure released. Recovered from the reaction capsule was an abrasive body consisting of a diamond compact bonded to a tungsten carbide backing by means of a thin continuous zirconium layer of thickness about 100 microns. The compact was firmly bonded to the backing. The body was in the form of a disc with the carbide backing being very much thicker than the compact.

The body was then cut into six sixty degree segments. Each segment was mounted in a conventional turning tool and used to turn an aluminum/silicon alloy (18 percent by weight silicon). It was found that the alloy could be turned many hundreds of times without any failure of the zirconium bond between the compact and backing.

When an excessive tangential turning force was applied to the body it was found that both the compact and backing cracked before any failure of the zirconium bond occurred which means that the zirconium bond is stronger than both the compact and backing.

The above method has been used to manufacture many hundreds of abrasive bodies, all of which were found to have strong bonds between the compact and backing. The achievement of the strong bond was found to be very much less sensitive to variations in manufacturing conditions compared with, for example, titanium bonding layers.

I claim:

1. An abrasive body comprising a diamond compact bonded to a cemented carbide backing by means of a continuous zirconium layer, the thickness of which is less than 0.5 mm, the diamond compact being substantially free of graphite and having a bonding matrix selected from a metal of Group VIII of the Periodic Table and an alloy containing one or more such metals and at least 70 percent by volume of diamond particles, and the cemented carbide backing being selected from cemented tantalum carbide, cemented tunsten carbide and cemented titanium carbide and mixtures thereof.

2. An abrasive body according to claim 1 wherein the diamond content of the compact is in the range 80 to 90 percent by volume.

3. An abrasive body according to claim 1 wherein the thickness of the zirconium bonding layer is in the range 50 to 500 microns.

4. An abrasive body according to claim 1 wherein said metal is selected from cobalt, iron, nickel and an alloy containing one or more of these metals.

5. An abrasive body according to claim 1 wherein the thickness of the zirconium bonding layer is at least 10 microns.

* * * * *